United States Patent
Dyer

(10) Patent No.: US 11,126,938 B2
(45) Date of Patent: Sep. 21, 2021

(54) TARGETED DATA ELEMENT DETECTION FOR CROWD SOURCED PROJECTS WITH MACHINE LEARNING

(71) Applicant: Accenture Global Solutions Limited, Dublin (IE)

(72) Inventor: Taurean Dyer, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 579 days.

(21) Appl. No.: 15/677,270

(22) Filed: Aug. 15, 2017

(65) Prior Publication Data

US 2019/0057335 A1    Feb. 21, 2019

(51) Int. Cl.
| | |
|---|---|
| *G06Q 10/06* | (2012.01) |
| *G10L 25/51* | (2013.01) |
| *G10L 15/18* | (2013.01) |
| *G06N 20/00* | (2019.01) |
| *G10L 15/22* | (2006.01) |
| *G06F 40/279* | (2020.01) |
| *G06F 40/284* | (2020.01) |
| *G10L 15/08* | (2006.01) |
| *G10L 25/63* | (2013.01) |
| *G10L 25/54* | (2013.01) |

(52) U.S. Cl.
CPC ..... *G06Q 10/06311* (2013.01); *G06F 40/279* (2020.01); *G06F 40/284* (2020.01); *G06N 20/00* (2019.01); *G10L 15/18* (2013.01); *G10L 15/22* (2013.01); *G10L 25/51* (2013.01); *G10L 25/54* (2013.01); *G10L 25/63* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,200,616 | B2 | 4/2007 | Takeuchi |
| 8,468,244 | B2 | 6/2013 | Redlich |
| 9,336,268 | B1 * | 5/2016 | Moudy .............. G06F 16/24578 |
| 10,223,244 | B2 | 3/2019 | Tahboub et al. |
| 10,445,671 | B2 | 10/2019 | Dubey et al. |
| 2002/0194045 | A1 | 12/2002 | Shay et al. |

(Continued)

FOREIGN PATENT DOCUMENTS

| | | | | |
|---|---|---|---|---|
| CN | 104573949 A | * | 4/2015 | ............. G06Q 10/06 |
| WO | WO 2014/111948 A1 | | 7/2014 | |

OTHER PUBLICATIONS

Bjarnason, Elizabeth et al. Evidence-based timelines for project retrospectives—A method for assessing requirements engineering in context. 2012 Second IEEE International Workshop on Empirical Requirements Engineering (EmpiRE) (pp. 17-24). (Year: 2012). (Year: 2012).*

(Continued)

*Primary Examiner* — Patricia H Munson
*Assistant Examiner* — Nancy N Prasad
(74) *Attorney, Agent, or Firm* — Crowell & Moring LLP

(57) ABSTRACT

The global proliferation of high speed communication networks has created unprecedented opportunities for geographically distributed resource interaction. A data structure synthesizer provides crowd source project management features, crowd source resource sentiment analysis features, and crowd source resource configuration features.

20 Claims, 10 Drawing Sheets

(56) References Cited

U.S. PATENT DOCUMENTS

| | | | |
|---|---|---|---|
| 2005/0193250 A1 | 9/2005 | Takeuchi | |
| 2006/0106675 A1* | 5/2006 | Cohen | G06Q 30/0601 705/26.1 |
| 2006/0190391 A1 | 8/2006 | Cullen | |
| 2006/0229902 A1 | 10/2006 | McGovern | |
| 2007/0299795 A1* | 12/2007 | Macbeth | G06Q 10/10 706/16 |
| 2008/0077530 A1 | 3/2008 | Banas | |
| 2009/0204470 A1 | 8/2009 | Weyl | |
| 2009/0254572 A1 | 10/2009 | Redlich | |
| 2010/0153155 A1 | 6/2010 | Dayasindhu et al. | |
| 2010/0280962 A1 | 11/2010 | Chan | |
| 2013/0317871 A1 | 11/2013 | Kulkarni et al. | |
| 2014/0095242 A1 | 4/2014 | Helbok et al. | |
| 2014/0122188 A1 | 5/2014 | Van Pelt et al. | |
| 2014/0172417 A1* | 6/2014 | Monk, II | G06F 40/30 704/9 |
| 2014/0214467 A1 | 7/2014 | Asur et al. | |
| 2014/0229413 A1 | 8/2014 | Dasgupta et al. | |
| 2014/0278657 A1 | 9/2014 | Horvitz et al. | |
| 2014/0358605 A1 | 12/2014 | Balamurugan et al. | |
| 2015/0178134 A1 | 6/2015 | Dai | |
| 2015/0213360 A1 | 7/2015 | Venanzi | |
| 2016/0132816 A1* | 5/2016 | Lush | G06Q 10/063112 705/7.14 |
| 2016/0140477 A1 | 5/2016 | Karanam | |
| 2018/0114159 A1 | 4/2018 | Dubey et al. | |
| 2019/0102716 A1 | 4/2019 | Kass et al. | |

OTHER PUBLICATIONS

Wang, Xiangyu et al. Comparative Effectiveness of Mixed Reality-Based Virtual Environments in Collaborative Design. IEEE Transactions on Systems, Man, and Cybernetics, Part C (Applications and Reviews) (vol. 41, Issue: 3, pp. 284-296). (Year: 2012). (Year: 2012).*

Church, Kenneth Ward, "Word Association Norms, Mutual Information, and Lexicography," *Computational Linguistics*, vol. 16, No. 1, Mar. 1990, pp. 22-29.

Goel G., et al., "Matching Workers Expertise With Tasks: Incentives in Heterogeneous Crowdsourcing Markets," NIPS Workshop on Crowdsourcing, Dec. 2013, 15 pages. [online], [retrieved on May 29, 2019] Retrieved from the Internet [URL:https://pdfs.semanticscholar.org/8d7e/1f05170561dffbc6b3a7e7aee9611919675b.pdf].

Howe, J, "Crowdsourcing: Why the Power of the Crowd is Driving the Future of Business," The International Achievement Institute, 2008, 9 pages.

Howe, J, "The Rise of Crowdsourcing," *Wired Magazine*, Jun. 1, 2006, 11 pages.

Margaret Rouse "Gig Economy," http://whatis.techtargetcom/definition/gig-economy, Jun. 8, 2016-Mar. 16, 2017 (6p), last accessed Jun. 20, 2017.

Software Testing Help, "The Definitive Guide to Crowdsourced Testing (for Testers and Companies)," http://web.archive.org/web/20150628171431/http://www.softwaretestinghelp.com/guide-to-crowdsourced-testing/, Jun. 28, 2015, 14 pages.

Speidel et al. "Enterprise Crowd Testing," Mar. 2014, *TE Testing Experience*, 6 pages.

Thaun, et al. "Factors Influencing the Decision to Crowdsource: A Systematic Literature Review," Information Systems Frontiers, 18(1), Jun. 2015, 34 pages.

Wikipedia, "Crowdsourcing," http://web.archive.org/web/20071016231656/http://en.wikipedia.org:80/wiki/Crowdsourcing, Oct. 11, 2007, 3 pages.

Yuen M., et al., "Task Matching in Crowdsourcing," 2011 IEEE International Conference on Internet of Things, 4th International Conference on Cyber, Physical and Social Computing, Oct. 2011, pp. 409-412. [online], [retrieved on May 29, 2019] Retrieved from the Internet:[URL: https://ieeexplore.ieee.org/abstractidocumentl6142254].

Zogaj et al. "Managing Crowdsourced Software Testing: A Case Study Based Insight on the Challenges of a Crowdsourcing Intermediary," Published online: Feb. 20, 2014, Article in *Journal of Business Economics*, 32 pages.

* cited by examiner

US 11,126,938 B2

TARGETED DATA ELEMENT DETECTION FOR CROWD SOURCED PROJECTS WITH MACHINE LEARNING

TECHNICAL FIELD

This application relates to data analysis, natural language processing, and machine learning applied over geographically distributed resources that contribute to execution of a complex project. This application further relates to communication with, and control over, the geographically distributed resources.

BACKGROUND

The global proliferation of high speed communication networks has created unprecedented opportunities for geographically distributed resource interaction. However, while the opportunities exist and continue to grow, the realization of those opportunities has fallen behind. In part, this is due to the enormous technical challenges of effectively connecting the geographically distributed resources in an effective operational environment that allows the resources to efficiently function together to accomplish a complex project.

DETAILED DESCRIPTION

Effectively providing an efficient collaborative environment that permits geographically disbursed resources to interact efficiently to successfully accomplish complex projects is a significant technical challenge. The dynamic process execution architecture described below provides technical solutions to establishing and controlling such a collaborative process execution environment. One beneficial result is that complex projects may be carried out in a far more flexible manner, by relying on resources that no longer need close physical proximity or common communication protocols. In particular, a crowd source data synthesizer (CSDS) tool is disclosed that provides crowd source project management features, crowd source resource sentiment analysis features, and crowd source resource configuration features.

Figure 1:
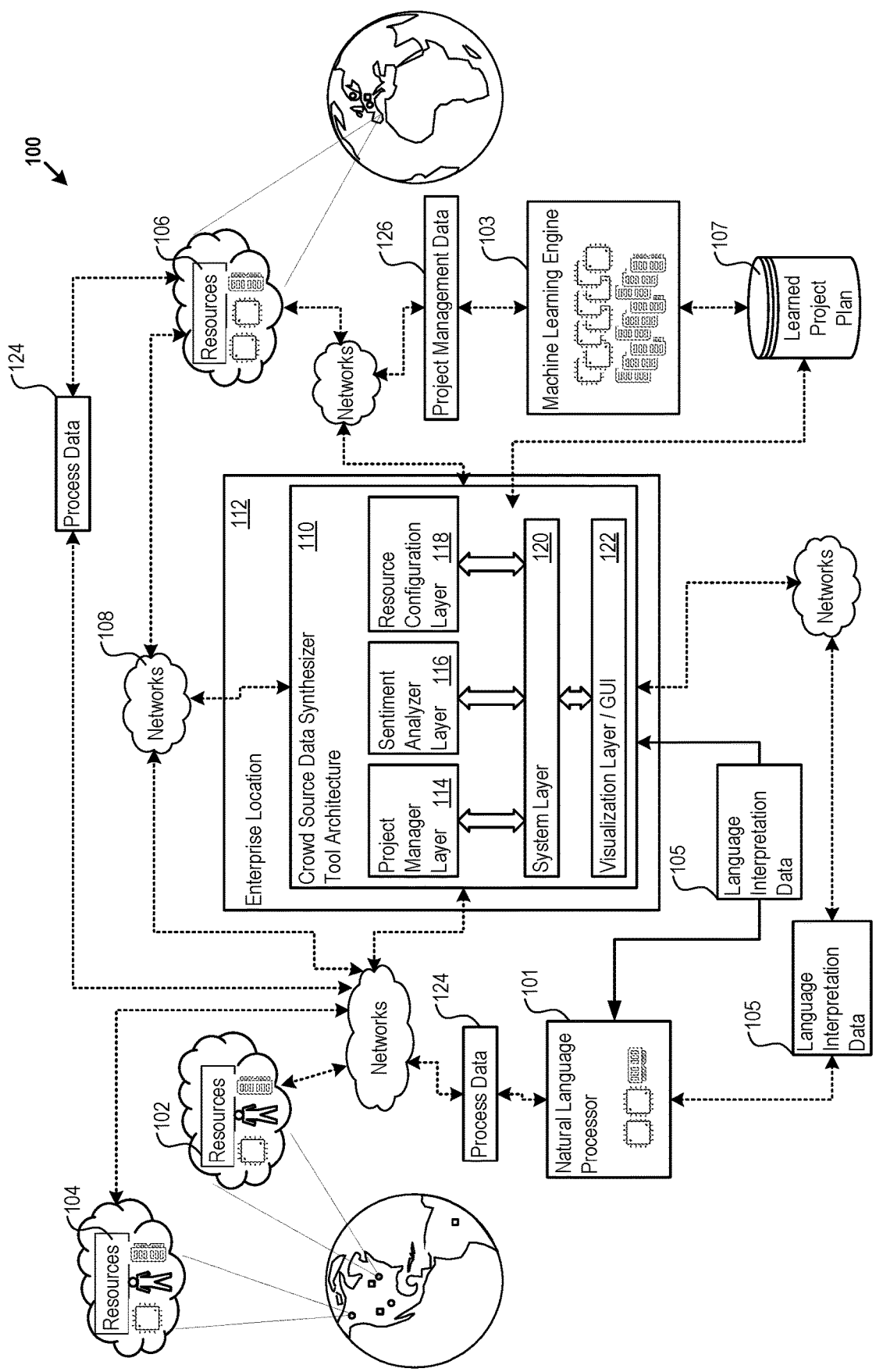
FIG. 1 shows an example of a global network architecture.
Figure 2:
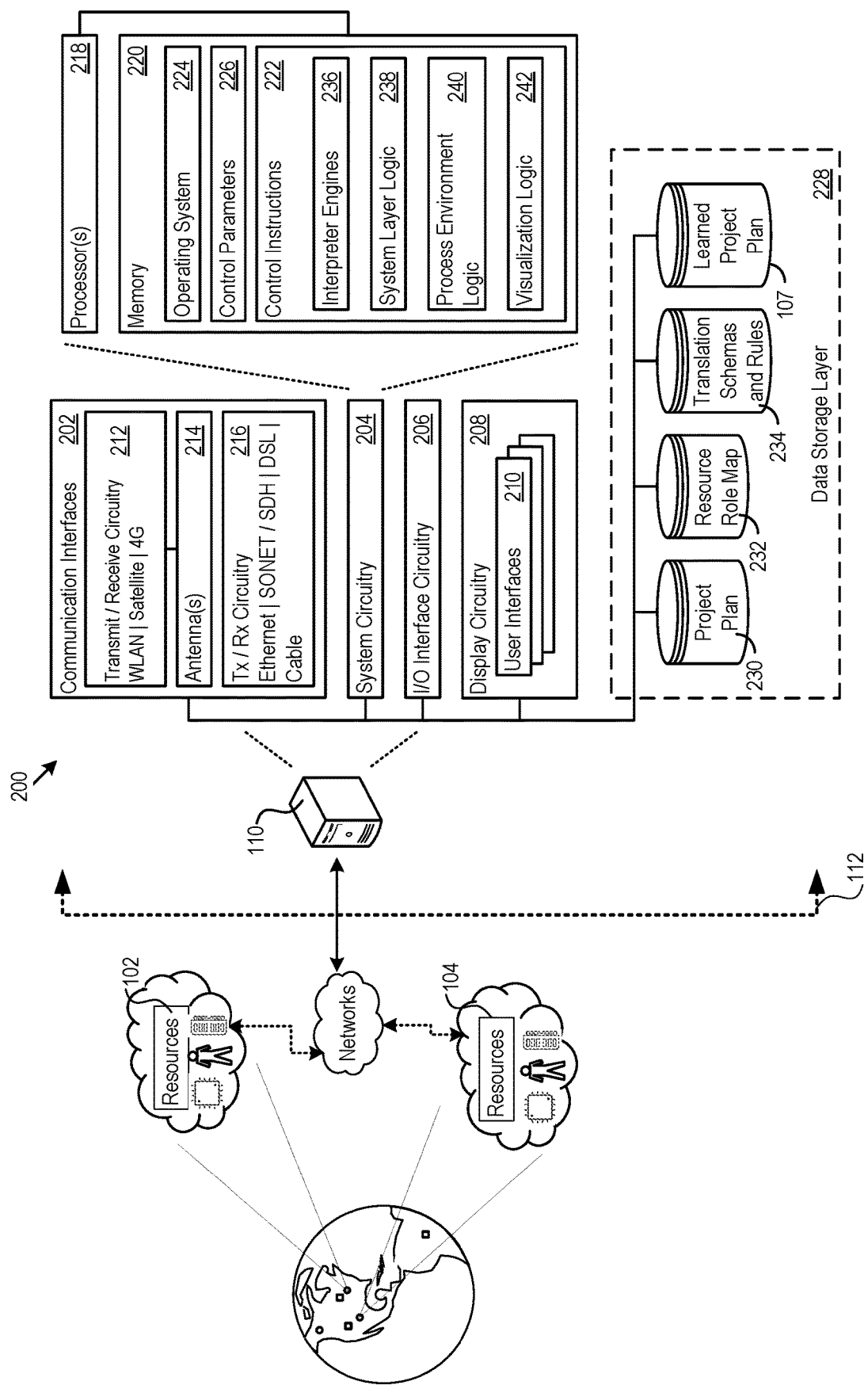
FIG. 2 illustrates an example implementation of the global network architecture.

FIGS. 1 and 2 provide an example context for the discussion below of the technical solutions in a CSDS tool architecture. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are resources, e.g., the resources 102, 104, and 106. These resources may be present at many different resource sites globally, and for certain types of resources (e.g., virtualized computing resources) the resource sites are service providers that host the resources. The resource sites and resources may be located in any geographic region, e.g., United States (US) East, US West, or Central Europe. Resources may correspond to any element of project execution, whether specific individuals (e.g., a GUI programmer), hardware resources (e.g., CPU, memory and disk resources), or software resources (e.g., algorithm or function packages, application software, operating systems, or database management systems). In addition, any of the resources and resource sites may provide resource descriptors for the resources. The resource descriptors may include data that characterizes, defines, or describes the resources. A few examples of resource descriptors include data specifying abilities, speed, reliability, location, availability, languages, cost, capability, capacity, experience, skill descriptors, historical performance data, and execution capability data. Further, resources and resource descriptors may also be present locally within an enterprise that seeks to carry out a project, in addition to being geographically distributed.

Throughout the global network architecture 100 are networks, e.g., the network 108. The networks provide connectivity between the resources, resource descriptors, service providers, enterprises, and other globally positioned entities. The networks 108 may include private and public networks defined over any pre-determined and possibly dynamic internet protocol (IP) address ranges.

A CSDS tool architecture ("architecture") 110 is hosted at an enterprise location 112, where the architecture 110 includes the components for operating the CSDS tool. The enterprise location 112 acts as a centralized control point over the processes needed to be executed to carry out a complex project using the geographically distributed resources. The complex project may be one that the enterprise itself needs to accomplish, though in other instances the enterprise location 112 may provide centralized control over complex projects for third parties.

In the example shown in FIG. 1, the architecture 110 includes a project management layer 114, a sentiment analyzer layer 116, and a resource configuration layer 118. A system layer 120 coordinates the operation and interactions among the management layer 114, the sentiment analyzer layer 116, and the resource configuration layer 118. In addition, the system layer 120 drives a visualization layer 122 that renders or outputs, for instance, a set of graphical user interfaces (GUIs) including visualizations and presentation of information that facilitate process execution among the resources, e.g. in HTML form or as digital video signals for driving displays.

The resources, resource sites and the enterprise location 112 exchange process data 124. Examples of process data

124 include process plans and process microplans; tool commands, instructions, and tool objects (such as tool input/output, e.g., HTML files, image files, sound files, source code files, and the like); messages, such as project plan task completion messages; visualizations, such as project plan review, editing, and completion GUIs, object package GUIs, and messaging interface GUIs. The process data 124 may also include language data in the form of streaming, or recorded, audio files, and digital messages (e.g., email messages, text messages, direct messenger messages, and the like) shared between the resources. The process data 124 may vary widely depending on the implementation of the architecture 110 and the particular process that drives work on the project.

The architecture 110 also includes a natural language processor 101. The natural language processor 101 receives the process data 124 from any one or more of the resources 102, 104, 106, and executes natural language processing on language data (e.g., audio files or messages that include alphanumeric information related to textual language information) included in the process data 124. The natural language processing recognizes textual and/or audible words and phrases included in the process data 124. The resulting language interpretation data 105 that is the output from the natural language processor 101, includes recognized words and phrases. The language interpretation data 105 is transmitted to the architecture 110 either directly, or through a network.

The architecture 110 also includes a machine learning engine 103. The machine learning engine 103 receives project management data 126 from the CSDS tool running on the architecture 110, and monitors the progression of a crowd sourced project managed by the CSDS tool based on an analysis of the project management data 126. For example, the machine learning engine 103 identifies a particular project being managed by the CSDS tool according to project profile data included in the project management data 126. The project profile data may include a project name, project field/industry, project goal, project requirements, project resources (e.g., team members, virtual machines, and the like), project location, or the like for characterizing a corresponding project. The machine learning engine 103 may further monitor and track progression of the particular project by identifying each distinguishable task comprising the particular project, and tracking an order in which each distinguishable task is accomplished during the duration of the particular project from the project profile data included in the project management data 126.

After completion of a project, performance statistics describing an overall performance of the completed project may be included in the project management data 126 that is received by the machine learning engine 103. The performance statistics may be comprised of a performance grade input by a project manager or client. The performance grade is applicable to the overall project, crowd sourced team as a whole unit, and/or individual team members.

The performance statistics may further be comprised of an effectiveness rating generated by the machine learning engine 103 or CSDS tool, where the effectiveness rating reflects an effectiveness of implementing a project in the order the project tasks were completed compared to same, or similar, projects that implemented same, or similar, project tasks in a different order. The machine learning engine 103 may store the received project management data in a learned project plan database 107, where the project management data is stored in the learned project plan database 107 in data clusters according to the project characterization data.

FIG. 2 shows an example implementation of the architecture 110 as implemented on a computer device system 200. The architecture 110 includes communication interfaces 202, system circuitry 204, input/output (I/O) interface circuitry 206, and display circuitry 208. The visualization layer 122 generates the GUIs 210 locally using the display circuitry 208, or for remote visualization, e.g., as HTML, JavaScript, audio, and video output for a web browser running on a local or remote machine. Among other interface features, the GUIs 210 may render interfaces for project task planning, inter-resource communication, exchange of object packages for review and for subsequent process stages, execution of tools in a dynamic workspace, and other features.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality in the architecture 110, including the project management layer 114, the sentiment analyzer layer 116, the resource configuration layer 118, the system layer 120, and the visualization layer 122. As just one example, the system circuitry 204 may include one or more instruction processors 218 and memories 220. The memories 220 store, for example, control instructions 222 and an operating system 224. In one implementation, the processor 218 executes the control instructions 222 and the operating system 224 to carry out any desired functionality for the architecture 110, including the functionality described below for the including the management layer 114, the sentiment analyzer layer 116, and the resource configuration layer 118, the system layer 120, and the visualization layer 122. The control parameters 226 provide and specify configuration and operating options for the control instructions 222, operating system 224, and other functionality of the architecture 110.

The architecture 110 may include a data storage layer 228 that hosts any number of local data repositories. In the exemplary computer device system 200 shown in FIG. 2, the data storage layer 228 includes a project plan database 230, a resource role mapping database 232, and a translation schemas and rules database 234. Although illustrated as separate from the architecture 110 in FIG. 1, the learned project plan database 107 may be included as part of the data storage layer 228.

As will be discussed below, project task project scheduler may be manually generated on a per-project basis (e.g., from a higher level project plan), or they may also be determined automatically (e.g., via a machine learning analysis by the machine learning engine 103 on prior projects, or rules and project task list based automatic generation feature). Any previously determined project plan, or microplan, may reside in the project plan database 230 or learned project plan database 107 for re-use on future projects. As will also be discussed further below, the project plan database 230 may include project profiles that describe attributes of a project being managed by the project management layer 114 of the CSDS tool. The information stored on the data storage layer 228 may be included in the project management data 126 transmitted to external resources such as, for example, the machine learning engine 103.

As will also be discussed further below, the resource role mapping database 232 may store records linking specific resource roles assigned to resources in the global network architecture 100 to specific process execution environments and project tasks during implementation of a project. For instance, a GUI developer role may map to a process execution environment including a desktop view, a messaging application, a computer aided design ("CAD") application, and a photo editing application, while a C++ developer role may map to a process execution environment including a desktop view, a messaging application, a C++ compiler and debugger, and a C++ code text editor. While the data storage layer 228 is shown local to the enterprise, the architecture 110 may connect to any network entity to access and exchange other sources of microplans, resource mappings, or any other data that facilitates control of the process execution environment.

The control instructions 222 drive the functionality of the architecture 110. Described in more detail below, the control instructions 222 may implement interpreter engines 236 responsive to the received language interpretation data 105 and/or translation schemas and rules in the translation database 234. The interpreter engines 236 may convert back and forth between tool-specific data elements described by tool-specific schemas and a normalized form (described, e.g., by a system schema) that the system layer logic 238 uses as it coordinates process execution among multiple tools, resources, and project plans. The process environment logic 240 dynamically specifies, builds, and tears-down process execution environments through which selected resources collaborate to complete projects. The visualization logic 242 generates the GUIs 210 to provide interfaces for task project planning, inter-resource communication, exchange of object packages for review and for subsequent process stages, execution of tools in a dynamic workspace, and other features.

The data storage layer 228, interpreter engines 236, system layer logic 238, process environment logic 240, and visualization logic 242, as well as the structure and content of the generated GUIs improve the functioning of the underlying computer hardware itself. That is, these features (among others described below) are specific improvements in the way that the underlying computer system operates. The improvements facilitate more efficient, accurate, consistent, and precise execution of complex projects using disparate geographically distributed resources. The improved functioning of the underlying computer hardware itself achieves further technical benefits. For example, the architecture 110 avoids lack of automation, reduces manual intervention, reduces the possibility for human error, and therefore increases task completion efficiency and reduces wait times for correct completion of complex projects.

Project Management Layer

Figure 3:
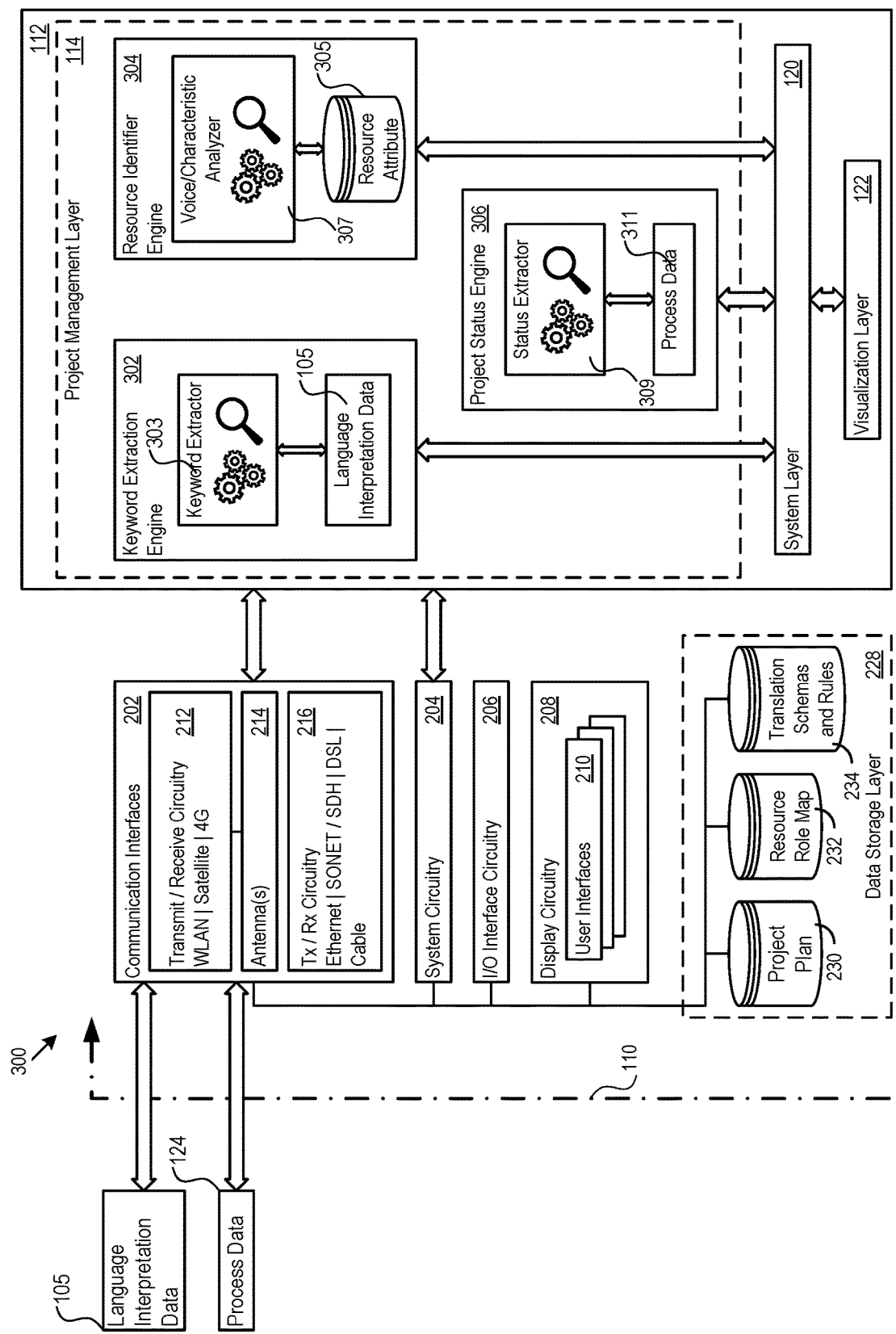
FIG. 3 shows one example of architectural components that may implement the project management layer in the architecture.

FIG. 3 shows one example of architectural components 300 that may implement the project management layer 114 in the architecture 110. The architectural components 300 are illustrated for exemplary purposes only, as additional, or fewer, components from the architecture 110 as illustrated in FIG. 2 may be utilized to accomplish the features of the project management layer 114 included in the CSDS tool. The project management layer 114 includes a keyword extraction engine 302, a resource identifier engine 304, and a project status engine 306.

Each project managed by the project management layer 114 may be described in a project profile stored in the project plan database 230. A project profile may identify a project name, a project field, a project goal, a project requirements, a project manager, a project resources, and a project task list. An exemplary project profile is provided below in Table 1.

TABLE 1

| | |
|---|---|
| Project Name: | Online time management application 1 |
| Project Field: | Healthcare |
| Project Goal: | Create an online time management portal for hospital staff to log their work hours |
| Project Requirements | Web-based portal; Staff-based work tracking database; Access to hospital staff profiles; Access to hospital staff work schedules; Application access authorities |
| Project Manager: | John Doe 1 |
| Project Resources(s): | Virtual Machine 1, Virtual Machine 2, John Doe 2, Jane Doe 1, Jane Doe 2 |
| Project Task List: | Task 1: Completed on Jan. 20, 2017 |
| Current Status | Task 2: In progress as of Feb. 2, 2017 |
| Remaining Tasks | Task 3: Next task to-do, completion goal Feb. 20, 2017 |
| Project Performance Statistics: | TBD by client |
| Grade | |
| Effectiveness rating | |

During implementation of the project, the project management layer 114 monitors and tracks the progression of the project by receiving and analyzing both the process data 124 and the language interpretation data 105. The status field in the process data 124 identifies a current task being worked on, as well as a completion field that identifies when a task is completed. The project status engine 306 receives the process data 124, and utilizes a status extractor 309 to obtain the project status information included in the status field. The project management layer 114 then updates the project profile stored in the project plan database 230 to reflect the current status information extracted from the status field of the process data 124. Table 1 illustrates the project profile including a project task identifying the status for three distinct tasks (task 1, task 2, and task 3) that comprise the project.

The project management layer 114 may also determine the current status of the project, or supplement the status information determined from the status field, based on an analysis of communications between the resources involved in the project. As described, the language interpretation data 105 is comprised of words and phrases that have been recognized after the process data 124 has been executed through the natural language processor 101. The keyword extraction engine 302 receives the language interpretation data 105 and utilizes a keyword extractor 303 to parse the language interpretation data 105, and extract keywords and key phrases related to the status of the project from the language interpretation data 105. The translation schemas and rules database 234 may store a list of predetermined targeted keywords and key phrases assigned to relate to a project's status. Thus, the keyword extraction engine 302 may reference the translation schemas and rules database 234, and compare the language interpretation data 105 against the list of targeted keywords and key phrases to identify the keywords and key phrases from the language interpretation data 105 that match with the targeted keywords and key phrases.

For instance, the language interpretation data 105 may relate to a conversation (either electronic messaging or digital audio file) between a programmer resource and a project manager discussing "completion" of a project task. The translation schemas and rules database 234 may store the word "completion" (either written or audio), as well as variations of the word "completion," into a predetermined list of targeted keywords and key phrases. By accessing the translation schemas and rules database 234, the keyword extraction engine 302 understands "completion" to be a predetermined keyword, and therefore the keyword extraction engine 302 flags the conversation when the keyword extractor 303 recognizes the word "completion" while parsing the language interpretation data 105 related to the conversation.

The keyword extraction engine 302 may then further analyze a predetermined amount of data prior to, and following, the occurrence of the keyword "completion" in the conversation to determine which project task has been completed. If the keyword extraction engine 302 is able to confirm a project task has been completed based on the analysis of the additional data surrounding the keyword "completion," the keyword extraction engine updates the project status accordingly in the project task list of the project profile stored in the project plan database 230. If the keyword extraction engine 302 is not able to confirm a project task has been completed based on the analysis of the additional data surrounding the keyword "completion," the keyword extraction engine 302 continues parsing the language interpretation data 105 for keywords and key phrases.

By flagging the conversation, an identity of the source behind the conversation may be determined by the project management layer 114. Specifically, the resource identifier engine 304 operates to recognize a source of the communications included in the conversation from the language interpretation data 105. The resource identifier engine 304 includes a voice/characteristic analyzer 307 that compares digital voice data included in the language interpretation data 105 against voice profiles stored in a resource attribute database 305. When the digital audio data matches a voice profile, the resource identifier engine 304 determines a resource associated with the matched voice profile as the source of the conversation communication. This resource identification by the resource identifier engine 304 may be utilized in conjunction with the keyword extraction engine 302 to attribute a source resource to a project status update determined from an analysis of digital voice data by the keyword extraction engine 302. This way, when the keyword extraction engine 302 relies on voice data to update the task list status, the source of the voice data may be attributed to the task list status update. A similar process may be applied by the resource identifier engine 304 on language information generally included in the process data 124.

Figure 5:
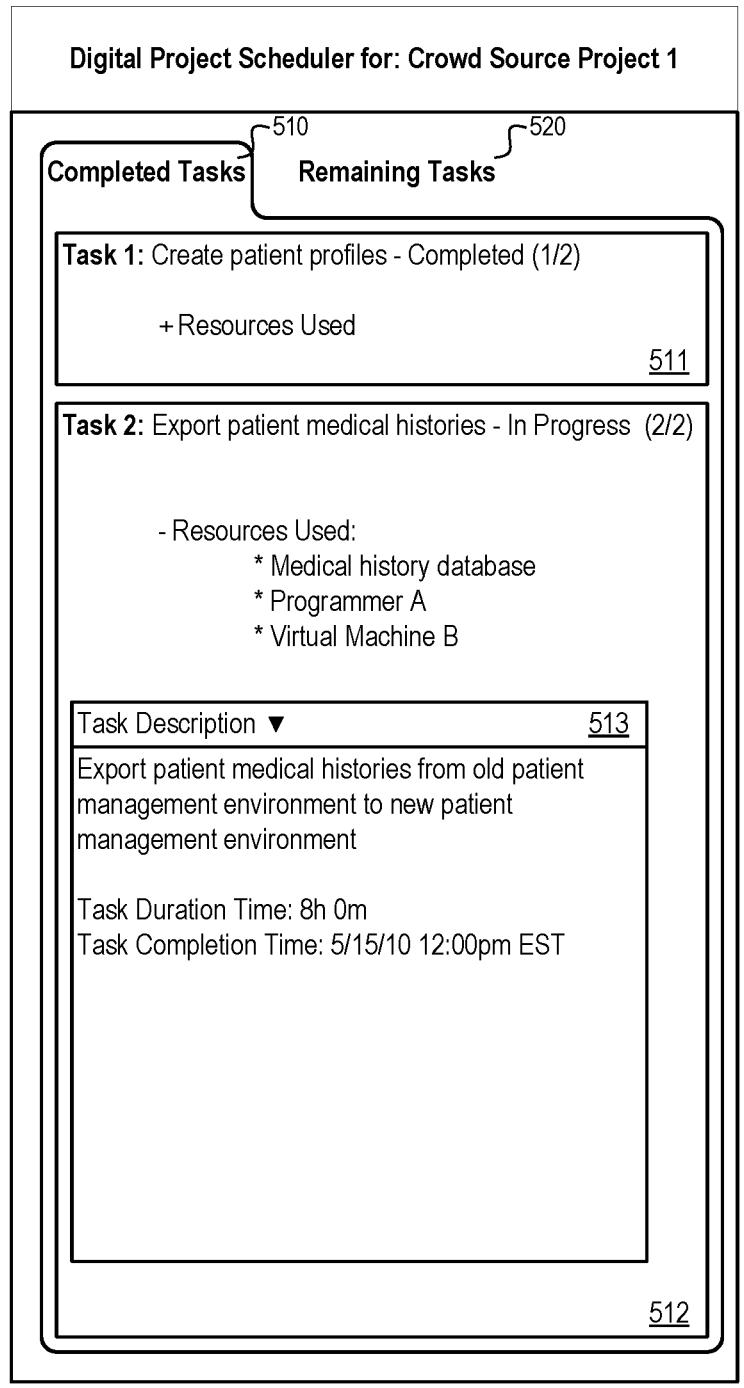
FIG. 5 shows a first view of an example of a digital project scheduler.

After updating a status for a project task in the project profile's task list, the project management layer 114 may communicate the status update to one or more of the resources identified as being part of the project team. The presentation of the status update may further serve as a reminder of project tasks that are still awaiting completion. To provide a more robust reminder, a digital project to-do list for the project may be generated by the project management layer 114 and presented to the team members in a digital project scheduler (e.g., digital project scheduler 500 is shown in FIG. 5) after the status update has been confirmed. The digital project scheduler includes project tasks having a status indicating the project task has not yet been completed. A recommended order in which to most efficiently and/or effectively complete the remaining tasks in the digital project scheduler may also be included in the presentation of the status update. In addition or alternatively, the status update is presented to the relevant resources that are part of the project team outside of the digital project scheduler. For example, when the resource is an agent, the status update is transmitted as an electronic message to a smartphone corresponding to the agent. When the resource is a computing resource, the status update is generated into a data format compatible with the computing resource.

The presentation of the status update and digital project scheduler may take on the form of digital messages and objects that are transmitted to the project resources by passing through the system layer 120 and the visualization layer 122 in several different manners and contexts described below. The architecture 110, through connectors in the system layer 120 (and communication interfaces 202 for externally hosted resources), exchanges messages and visualization objects that represent the status update and digital project scheduler with the other project resources located remotely from the architecture 110. The connectors may be implemented as web data connectors (WDC), for instance, configured to read data from virtually any resource site that provides data in JSON, XML, HTML, or other formats. That is, the architecture 110 in place at any given enterprise location may communicate with local and remote resource sites, and geographically distributed resources to exchange project messages and project objects in connection with coordination and control over a complex project.

In addition to communicating the status updates and digital project scheduler to the project team members, the project management layer 114 may also transmit the status update to the machine learning engine 103 as part of the project management data 126. After completion of the project and/or after all of the project tasks identified in the project list of the project profile, a client or project manager may upload project performance statistics into the project profile stored on the project plan database 230.

The machine learning engine 103 creates its own database of project profiles and historical performances in the learned project plan database 107 based on the project management data 126 received from the project management layer 114. The project profiles generated by the machine learning engine 103 and stored into the learned project plan database 107 may include the same, or similar, project profile information as the project profiles stored in the project plan database 230. In addition, the machine learning engine 103 further clusters the project profiles stored on the learned project plan database 107 based on one or more shared attributes. For example, the machine learning engine 103 may group project profiles within a common project field into the same data cluster. The machine learning engine 103 may also group project profiles having a same project goal into the same data cluster. By grouping similar project profiles into the same data cluster, the machine learning engine 103 can learn more efficiently from a sub-set of data that includes related project profiles, rather than inefficiently parsing a larger data set that may not be relevant to a present machine learning goal.

An exemplary learned project profile stored in the learned project plan database 107 provided below in Table 2.

TABLE 2

| | |
|---|---|
| Project Name: | Online time management application 1 |
| Project Field: | Healthcare |
| Project Goal: | Create an online time management portal for hospital staff to log their work hours |
| Project Requirements | Web-based portal; Staff-based work tracking database; Access to hospital staff profiles; Access to hospital staff work schedules; Application access authorities |
| Project Manager: | John Doe 1 |
| Project Team Member(s): | Virtual Machine 1, Virtual Machine 2, John Doe 2, Jane Doe 1, Jane Doe 2 |
| Project Performance Statistics: | Grade: B+ |
| Grade | Effectiveness: A |
| Effectiveness rating | Timeliness: B |
| Project Task List: | Project Task Completion Order: |
| Current Status | |
| Remaining Tasks | |

A goal of the machine learning engine 103 is to observe the data included in the project profiles and historical project performances, and apply machine learning techniques to understand what type of project is being worked on by a team, and generate a task list for the project without initially requiring the task list as an input. This way, a project team manager may receive the task list from the machine learning engine 103 after inputting only project profile information describing the project. This saves time and resources as the manager is no longer required to upload an extensive and detailed task list for their projects. The machine learning engine 103 may further track the status of projects to dynamically generate a digital project scheduler that identifies a list of remaining tasks lists to complete the current project, as well as an optimized order in which to accomplish the remaining tasks. The digital project scheduler may be generated by the machine learning engine 103 based on the machine learning from the historic performance of similar projects.

Figure 4:
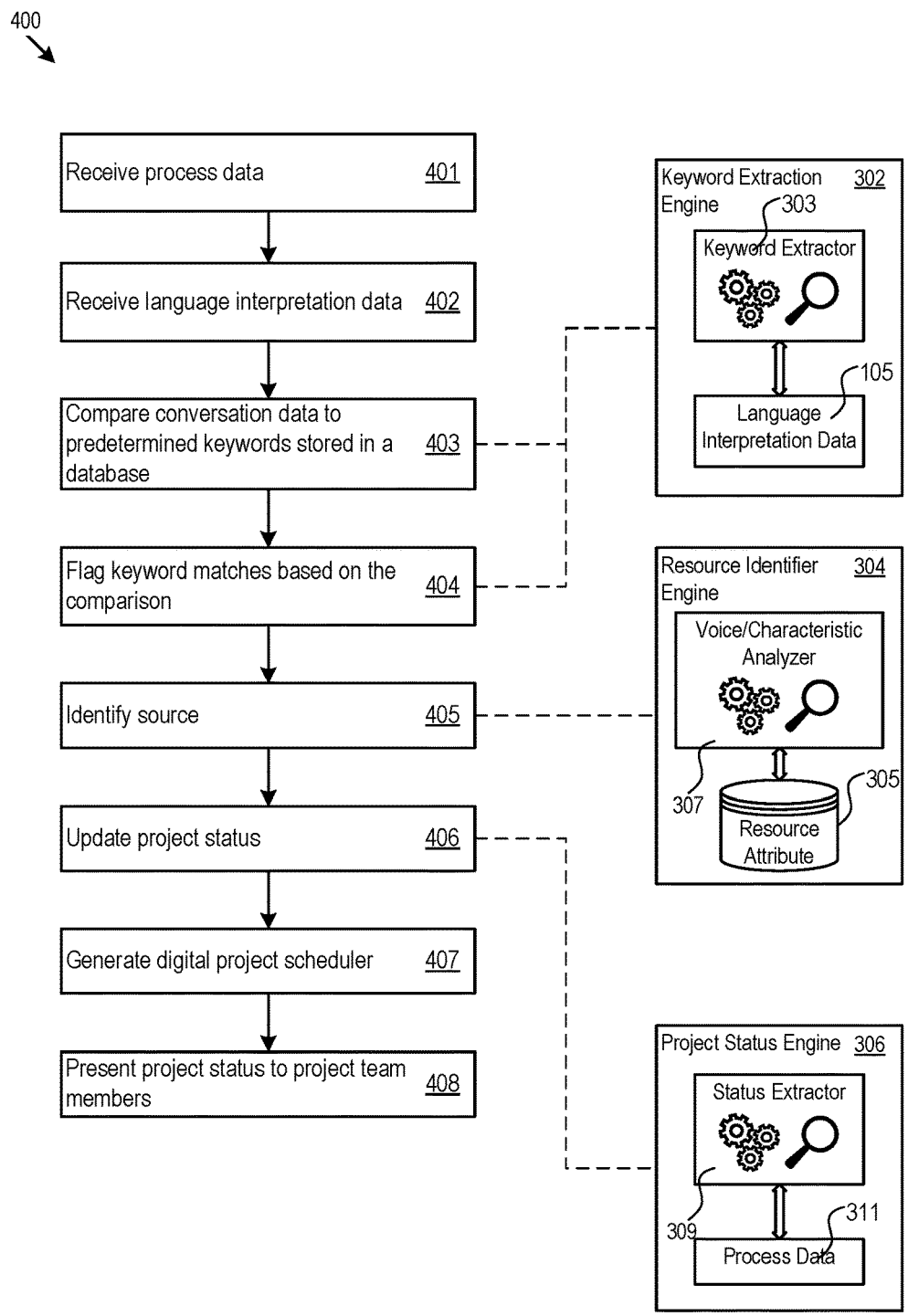
FIG. 4 shows an exemplary flow diagram of logic that the architecture may implement.

FIG. 4 shows a flow diagram 400 of logic that the architecture 110 may implement while running the CSDS tool. In one implementation, the project management layer 114 receives process data 124 from resources (e.g., resources 102, 104, 106) working together on a crowd sourced project within the global network architecture 100 (401). The process data 124 may include project profile information describing attributes of the project. The project management layer 114 also receives language interpretation data 105 that has been processed by the natural language processor 101.

After receiving the process data 124, the project management layer 114 further receives language interpretation data 105 from the natural language processor 101 (402). The language interpretation data 105 and/or process data 124 includes conversation data of conversations made between the different resources (e.g., resources 102, 104, 106) working together on a crowd sourced project within the global network architecture 100.

The keyword extraction engine 302 compares the words in the conversation data to predetermined keywords stored in, for example, the translation schemas and rules database 234 (403). When the keyword extraction engine 302 identifies a match from the comparison, the keyword extraction engine 302 flags the keyword from the conversation data as relating to a recognized emotional state for the speaker (404). Based on the keyword flag, the project management layer 114 may implement further analysis on the conversation data. For example, the language interpretation data 105 immediately preceding and/or following the matched keyword from the conversation data may be further analyzed to recognize a context of the keyword used within the conversation. The context of the keyword within the conversation is then referenced by the project management layer 114 to determine whether a change in the project status is warranted.

The resource identifier engine 304 identifies a source of the keyword recognized from the conversation data (405). The source's identity is referenced when updating the project status by the project status engine 306 (406). For example, the project status engine 306 includes the identity of the source that prompted the project status update in the corresponding project profile.

As part of the project status update, the project management layer 114 generates a digital project scheduler identifying the remaining tasks that need to be completed to complete the project (407). The digital project scheduler may be arranged to propose an order in which to complete the remaining tasks. An exemplary first view of a digital project scheduler 500 is shown in FIG. 5. The digital project scheduler 500 is generated for an exemplary crowd sourced project 1 related to the creation and testing of a new hospital patient management environment. The digital project scheduler 500 includes a completed tasks field 510 (including completed Task 1 and completed Task 2), and a remaining tasks field 520. Other fields and/or views may be included in the digital project scheduler 500 based on information from the project profile corresponding to the exemplary crowd sourced project 1.

The completed tasks field 510 includes a first task field 511 related to information on the first completed Task 1, and a second task field 512 related to the second completed Task 2. Each of Task 1 and Task 2 have been confirmed by the project management layer 114 as being completed. Task 1 relates to the creation of new patient profiles to populate the new patient management environment. The resources used to accomplish Task 1 and/or Task 2 can be viewed by selecting the "Resources Used" option. Task 2 relates to exporting patient medical histories from the old patient management environment to the new patient management environment. Here, the "Resources Used" option has been selected to reveal the following resources were used to complete Task 2: medical history database, programmer A, and virtual machine B.

The second task field 512 also includes a task description field 513 that describes Task 2. The task description field 513 also includes a task duration time describing an amount of time it took to complete Task 2, and a task completion time describing a time and date at which Task 2 was completed.

Figure 6:
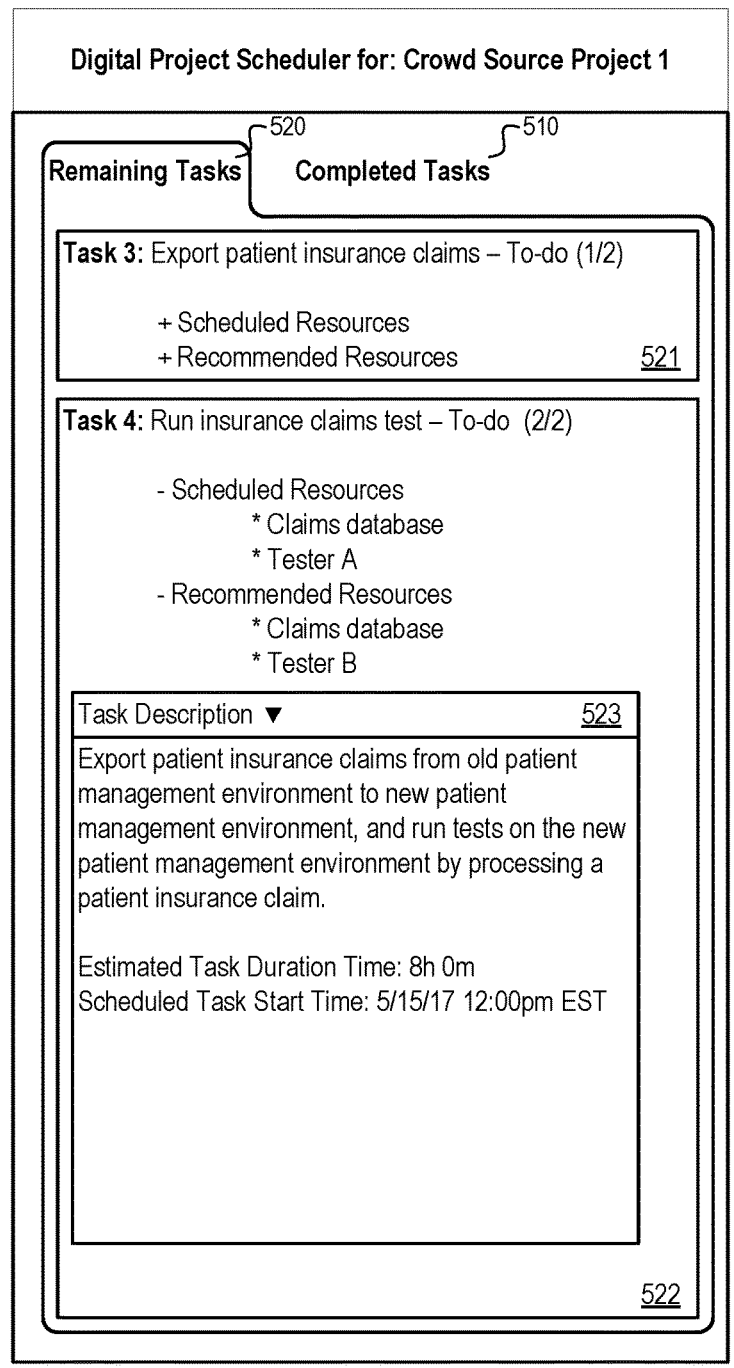
FIG. 6 shows a second view of an example of a digital project scheduler.

FIG. 6 shows a second view of the digital project scheduler 500 that includes a list of remaining tasks in a remaining tasks field 520, including Task 3 and Task 4. Task 3 relates to exporting patient insurance claims from the old patient management environment to the new patient management environment. Task 3 is shown in a third task field 521 as including a list of scheduled resources that are scheduled to be utilized to accomplish Task 3. The scheduled resources may have been included during the initial planning of stage of the project. In addition, the project management layer 114 generates a list of recommended resources for accomplishing Task 3. The list of recommended resources may be the same as the list of scheduled resources. The list of recommended resources may also be different from the list of scheduled resources, as is the case for Task 4 shown in a fourth task field 522.

Task 4 relates to testing the new patient management environment by running a test insurance claim through the new patient management environment. Here, the project management layer 114 recommends Tester B over scheduled Tester A. The list of recommended resources is generated through the added processing of the resource configuration layer 118, as described in more detail herein. The fourth task field 522 also includes a task description field 523 describing Task 4. The task description field 523 also includes an estimated task duration time describing an estimated amount of time for completing Task 4 (for either the scheduled resources or the recommended resources), and a scheduled task start time for Task 4.

Following the project status update, the project management layer 114 initiates a presentation of the project status update through both the system layer 120 and the visualization layer 122 (408). The system layer 120 identifies team member resources included in the project whose project status has been updated, and controls the corresponding transmission circuitry to transmit the project status update to the identified team member resources. The visualization layer 122 is responsible for generating the visualizations that will be used to present a project status update message, as well as the digital project scheduler. In some implementations, the digital project scheduler may be presented to those resources that are scheduled to be involved in the implementation of remaining tasks. The timing of the digital project scheduler presentation may further be controlled to be presented immediately upon updating of the project status, or selectively delayed for each scheduled resource such that the digital project scheduler is presented to a resource a predetermined time period before the resource is scheduled begin work on a corresponding task.

Sentiment Analyzer Layer

Figure 7:
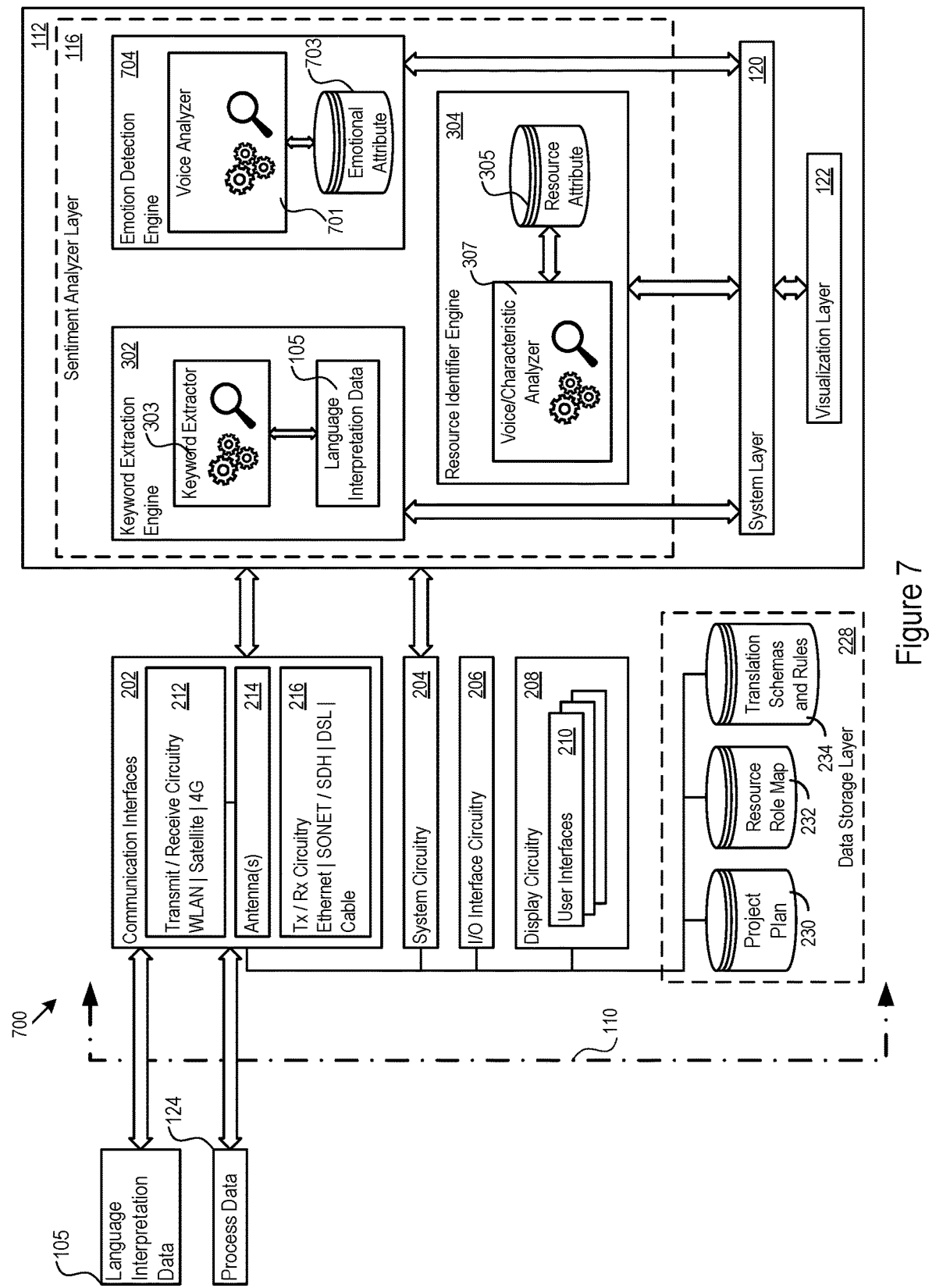
FIG. 7 shows one example of architectural components that may implement the sentiment analyzer layer in the architecture.

FIG. 7 shows one example of architectural components 700 that may implement the sentiment analyzer layer 116 in the architecture 110. The architectural components 700 are illustrated for exemplary purposes only, as additional, or fewer, components from the architecture 110 as illustrated in FIG. 2 may be utilized to accomplish the features of the sentiment analyzer layer 116 included in the CSDS tool. The sentiment analyzer layer 116 receives the language interpretation data 105 and the process data 124, extracts keywords from the language interpretation data 105 and process data 124, and determines a predicted emotion of a resource based on an analysis of the language interpretation data 105 and the process data 124.

The sentiment analyzer layer 116 includes the keyword extraction engine 302, the resource identifier engine 304, and an emotion detection engine 704. The keyword extraction engine 302 is included in the sentiment analyzer layer 116 to match and extract keywords from the language interpretation data 105. The language interpretation data 105 may include digital written data related to digital conversations between resources during implementation of the project. Here, the keyword extractor 303 accesses the translation schemas and rules database 234 to reference a set of emotional keywords. The set of emotional keywords may include words and/or phrases that are predicted to relate to specific emotional states of a source (i.e., a resource person).

Exemplary emotional keywords may include "sad," "mad," "no," "upset," "happy," or other words related to an emotional state. The keyword extractor 303 parses the language interpretation data 105 and compares the words and/or phrases from the language interpretation data 105 to the set of emotional keywords to determine if there are matches. Recognized matches are flagged by the keyword extraction engine 302.

In addition to the keyword matching features, the sentiment analyzer layer 116 further utilizes the emotion detection engine 704. The process data 124 may include audio data related to conversations between resources during the implementation of the project. The emotion detection engine 704 includes a voice analyzer 701 to determine an emotional state of a source based on audible cues detected from audio data included in the process data 124. The audible cues relate to detectable attributes from the audio data such as increases/decreases in speech volume intensity, increases/decreases in speech pace, increases/decreases in speech pitch, or the like. The audible cues may also relate to the recognition of certain speech patterns or keywords.

To recognize the audible cues related to specific emotions, the voice analyzer 701 communicates with an emotional attribute database 703 including audio profiles corresponding to specific emotional states. An audio profile includes predetermined audio data attributes (e.g., loudness, pace, pitch, or other measurable audio data attribute) that are known to relate to specific emotional states.

So, by comparing the audible characteristics from the audio data included in the process data 124 with the audio profiles stored in the emotional attribute database 703 and detecting a match, the voice analyzer 701 then flags the matched audio data as relating to an emotional state associated with the matched audio profile. The source (i.e., speaker) of the audio data may be recognized by the resource identifier engine 304 described earlier.

By receiving the results from the keyword extraction engine 302 and the emotion detection engine 704, the sentiment analyzer layer 116 is able to determine an emotional state of a source (i.e., speaker) participating in a conversation included in the language interpretation data 105 and/or included in the process data 124. The determined emotional state may be referenced by the resource configuration layer 118 when reorganizing team resources during a project.

Figure 8:
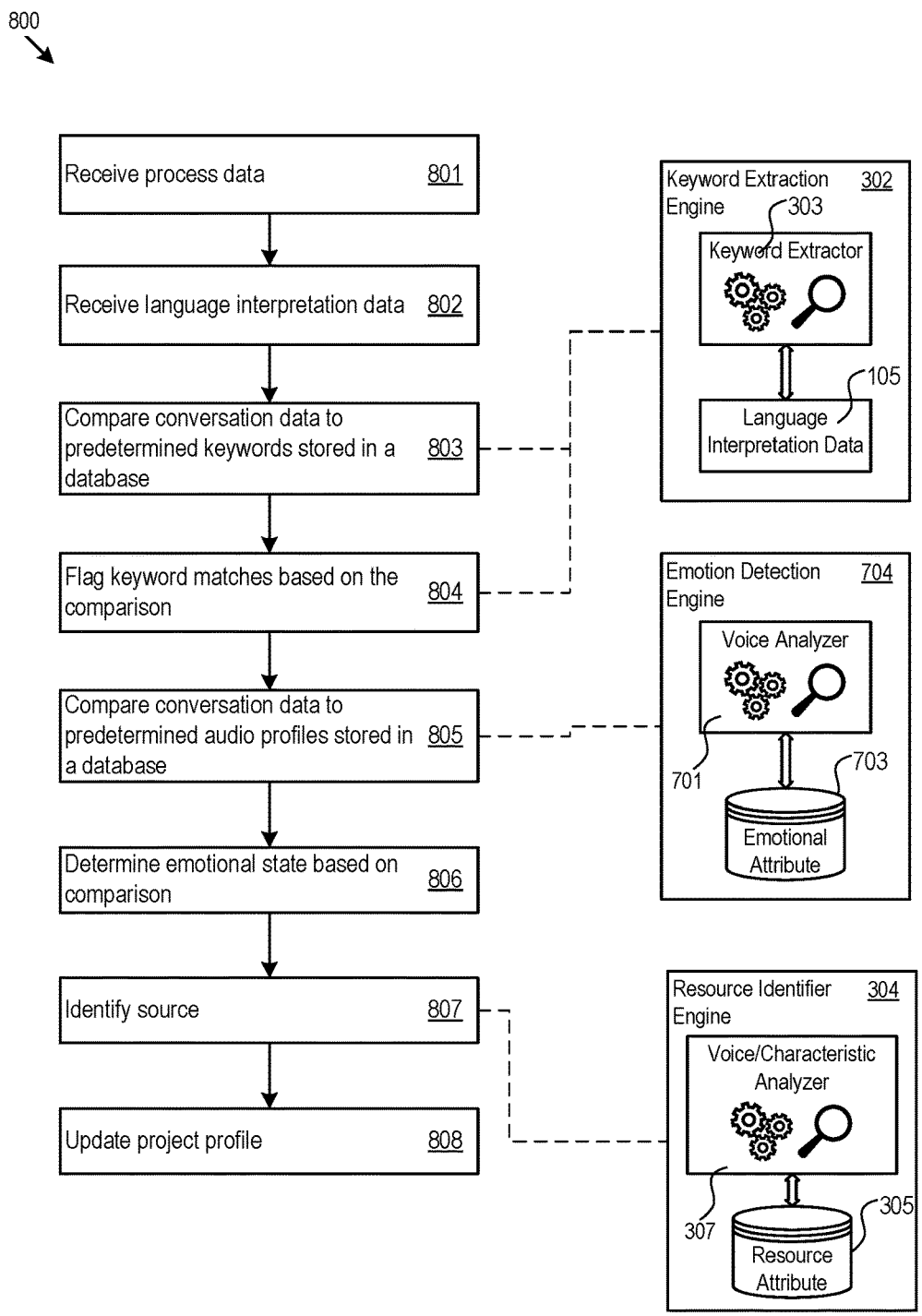
FIG. 8 shows an exemplary flow diagram of logic that the architecture may implement.

FIG. 8 shows a flow diagram 800 of logic that the architecture 110 may implement while running the CSDS tool. In one implementation, the sentiment analyzer layer 116 receives process data 124 from resources (e.g., resources 102, 104, 106) working together on a crowd sourced project within the global network architecture 100 (801). The process data 124 may include project profile information describing attributes of the project. The sentiment analyzer layer 116 also receives language interpretation data 105 that has been processed by the natural language processor 101.

After receiving the process data 124, the sentiment analyzer layer 116 further receives language interpretation data 105 from the natural language processor 101 (802). The language interpretation data 105 and/or process data 124 includes conversation data of conversations made between the different resources (e.g., resources 102, 104, 106) working together on a crowd sourced project within the global network architecture 100.

The keyword extraction engine 302 compares the words from the conversation data to predetermined keywords related to emotional states stored in, for example, the translation schemas and rules database 234 (803). When the keyword extraction engine 302 identifies a match from the comparison, the keyword extraction engine 302 flags the keyword from the conversation data as relating to a recognized emotional state for the speaker (804). Based on the keyword flag, the sentiment analyzer layer 116 may implement further analysis on the conversation data. For example, the language interpretation data 105 immediately preceding and/or following the matched keyword from the conversation data may be further analyzed to recognize a context of the keyword used within the conversation. The context of the keyword within the conversation is then referenced by the sentiment analyzer layer 116 to better determine the emotional state of the speaker.

The sentiment analyzer layer 116 also utilizes the emotion detection engine 704 to compare audio files included in the conversation data with predetermined audio profiles stored in, for example, an emotional attribute database 703 (805). When audio characteristics from the audio files match a predetermined audio profile, the sentiment analyzer layer 116 flags the audio file as having an emotional state described in the predetermined audio profile (806).

To determine a speaker in the flagged audio file, the sentiment analyzer layer 116 utilizes the resource identifier engine 304 to identify the speaker (807). The source identity recognized by the resource identifier engine 304 is referenced when updating the project status. The sentiment analyzer layer 116 receives one, or both, of the emotional state results from the keyword extraction engine 302 and the emotion detection engine 704 to determine an emotional state of the speaker. The sentiment analyzer layer 116 updates the project status to include the determined emotional state for the speaker included as a resource of the project team (808). The emotional state may be referenced by the resource configuration layer 118 to reorganize the project team.

Resource Configuration Layer

Figure 9:
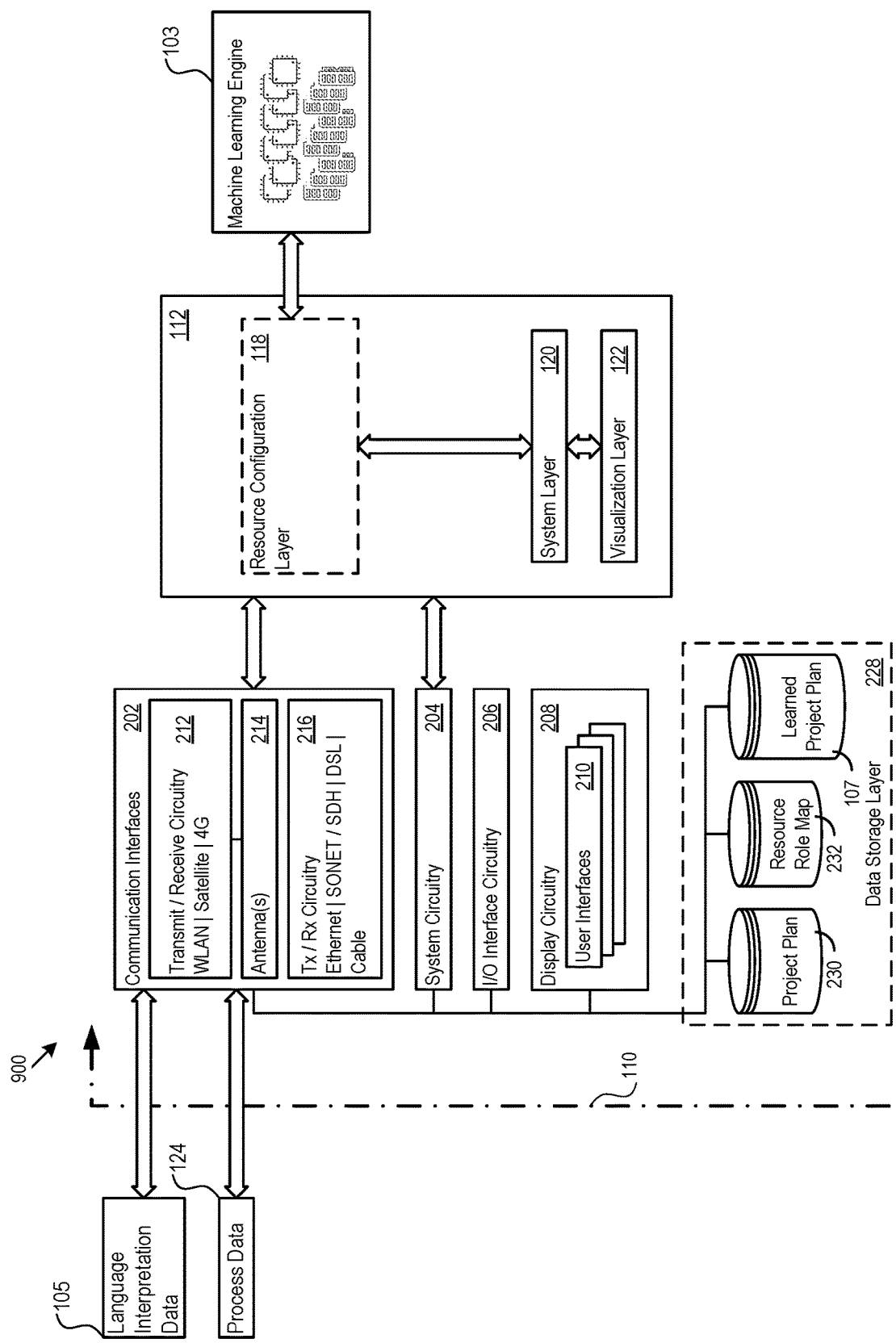
FIG. 9 shows one example of architectural components that may implement the resource configuration layer in the architecture.

FIG. 9 shows one example of architectural components 900 that may implement the resource configuration layer 118 in the architecture 110. The architectural components 900 are illustrated for exemplary purposes only, as additional, or fewer, components from the architecture 110 as illustrated in FIG. 2 may be utilized to accomplish the features of the resource configuration layer 118 included in the CSDS tool. The resource configuration layer 118 is in communication with the machine learning engine 103, and the resource configuration layer 118 is called on by the CSDS tool to re-evaluate project teams and proposed modified combination of resources for the project teams based on the re-evaluation.

The resource configuration layer 118 accesses the project plan database 230 to identify project tasks that have been completed and project tasks that remain to be completed. The resource configuration 118 is prompted by an update to a project profile to re-evaluate the assigned resources to a project task, and generate a recommended modification to the assigned resources. The recommended modifications are presented, for example, through the digital project scheduler 500 as a "recommended resources" message included in the fourth task field 522. The recommended resources message is interpreted as a message that although resources 1) claims database, and 2) Tester A, are scheduled and assigned to implement Task 4, the resource configuration layer 118 has determined that actually the 1) claims database, and 2) Tester B are the better project team for Task 4. This recommendation for changing the combination of resources to implement Task 4 is a calculation made by the resource configuration layer 118 based on available information gathered from one or more of the project plan database 230, the machine learning engine 103, and the learned project plan database 107.

According to some embodiments, the resource configuration layer 118 accesses the project plan database 230 to determine an emotional state for resources on the project team. When a resource is flagged as being predicted to be in one or more predetermined emotional states (e.g., stressed, unhappy, or the like), the resource configuration layer 118 may recommend that resource be removed from the project team of a next project task. Conversely, when a resource is flagged as being predicted to be in one or more predetermined emotional states (e.g., happy, or another positive emotional state), the resource configuration layer 118 may recommend that resource be added to a project team of a next project task.

The resource configuration layer 118 may also access the learned project plan database 107 to parse through historical performance data for resources. The historical performance data may relate to a resource's historical performance implementing a particular project task, or a resource's historical performance working on a project team with other particular resources. When the resource's historical performance is found to be below a certain predetermined performance threshold, the resource configuration layer 118 may recommend that resource be removed from the project team of a project task the resource is predicted to perform poorly at. Conversely, when the resource's historical performance is found to be above a certain predetermined performance threshold, the resource configuration layer 118 may recommend that resource be added from the project team of a project task the resource is predicted to perform well at.

The resource configuration layer 118 may also utilize the machine learning engine 103 to generate a prediction for how an assigned project team will perform at a next project task. The machine learning engine 103 references historical performance data from the learned project plan database 107, where the learned project plan database 107 is continually updated with project performance results. When the resource's historical performance is determined by the machine learning engine 103 to be below a certain predetermined performance threshold, the machine learning engine 103 may recommend that resource be removed from the project team of a project task the resource is predicted to perform poorly at. Conversely, when the resource's historical performance is found to be above a certain predetermined performance threshold, the machine learning engine 103 may recommend that resource be added from the project team of a project task the resource is predicted to perform well at. The recommendation output by the machine learning engine 103 is received by the resource configuration layer 118 and presented on, for example, the digital project scheduler 500.

Figure 10:
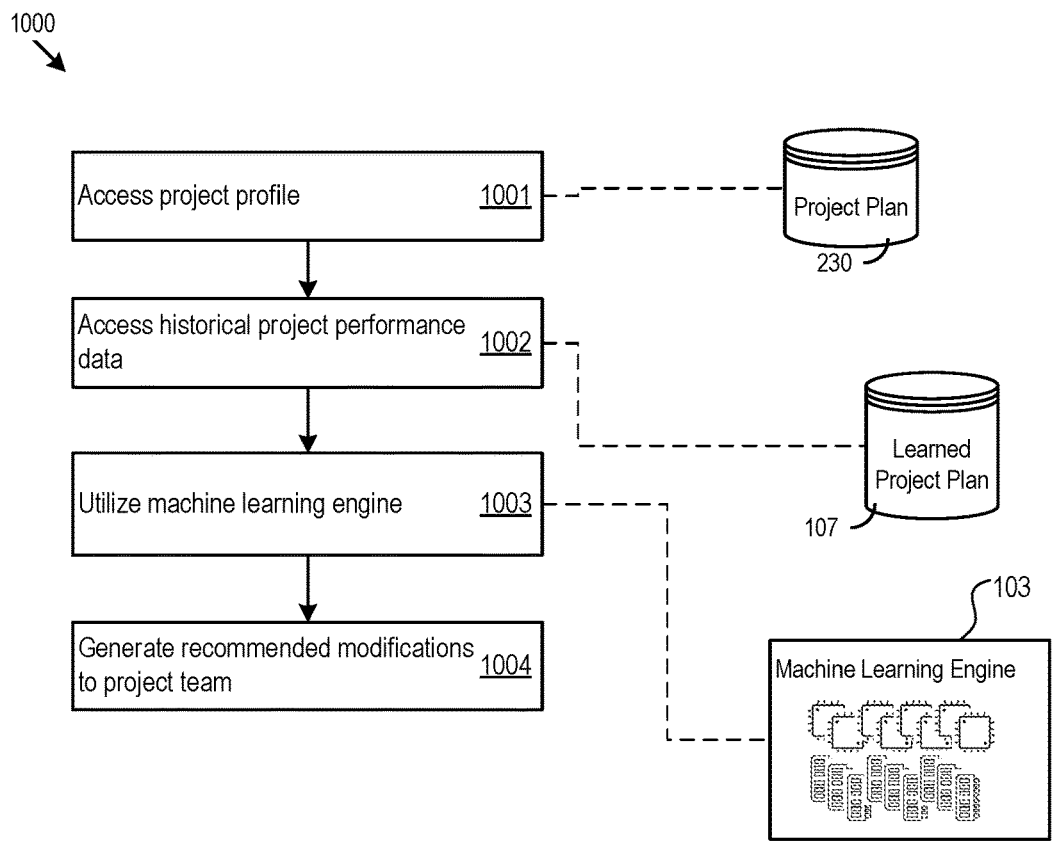
FIG. 10 shows an exemplary flow diagram of logic that the architecture may implement.

FIG. 10 shows a flow diagram 1000 of logic that the architecture 110 may implement while running the CSDS tool. In one implementation, the resource configuration layer 118 accesses the project plan database 230 to parse project profiles for information on project resources (1001). The project resource information may include information on an emotional state predicted for a resource included on a project team. The project profiles may also include a digital project scheduler for the project, including a list of completed project tasks and remaining project tasks.

The resource configuration layer 118 also accesses the learned project plan database 107 to parse historical project performance data (1002). The historical project performance data may include performance scores for a resource having completed a same, or similar, project. The historical project performance data may also include compatibility scores relating to a level of perceived compatibility of a resource in working with other identified resources on project teams in the past.

The resource configuration layer 118 also utilizes the machine learning engine 103 to predict an optimized project team for a remaining project task (1003). The machine learning engine 103 may rely on historical project performance data stored on the learned project plan database 107. The historical project performance data may include performance scores for a resource having completed a same, or similar, project. The historical project performance data may also include compatibility scores relating to a level of perceived compatibility of a resource in working with other identified resources on project teams in the past.

The resource configuration layer 118 references one or more of the project profiles or the historical project performance data, and/or utilizes the machine learning engine 103, to generate recommended modifications to a project team. The recommended modifications may switch out underperforming resources with one or more other resources that are predicted to perform at a higher efficiency and/or higher performance.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions 222 read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry. Various implementations have been specifically described. However, many other implementations are also possible.

What is claimed is:

1. An enterprise server computer comprising:
a communication interface operable to communicate with a first resource, a second resource, a rules database, and a project plan database;
project management circuitry coupled to the communication interface, the project management circuitry configured to:
receive, through the communication interface, process data from the first resource, the second resource, or both during implementation of a project, the process data including conversation data between the first resource and the second resource, the conversation data comprising audio data;
translate, by a natural language processing tool, the audio data included in the conversation data into textual data tokens;
access, through the communication interface, keyword data from the rules database;
compare the conversation data with the keyword data;
identify a conversation keyword from the conversation data, the conversation keyword included in the keyword data;
access, through the communication interface, a project plan from the project plan database, the project plan including a list of project tasks for the project;
determine a first project task is completed based on the conversation keyword;
determine a next project task based on the conversation keyword;
generate a machine interface comprising a rendering of the next project task;
transmit the machine interface to an external entity; and
execute a machine learning engine to:
monitor and track progression of the project by identifying each project task included in the project plan;
track an order in which each project task is accomplished during a duration of the project;
generate an effectiveness rating reflecting an effectiveness of implementing the project in the order the project tasks were completed compared to same or similar projects that implemented same or similar project tasks in a different order; and
track a status of the project to dynamically generate a digital project scheduler that identifies a list of remaining tasks to complete the project and an optimized order in which to accomplish the remaining tasks.

2. The enterprise server computer of claim 1, wherein the project management circuitry is further configured to:
   execute a resource identifier engine to recognize a speaker from the audio data.

3. The enterprise server computer of claim 2, further comprising a sentiment analyzer circuitry configured to:
   execute an emotion detection engine to determine an emotional state of the speaker from the audio data; and
   update the project plan to identify the emotional state of the speaker.

4. The enterprise server computer of claim 1, wherein each project plan includes a list of completed project tasks, a list of remaining project tasks, and a list of project team resources.

5. The enterprise server computer of claim 1, wherein the project management circuitry is configured to generate the machine interface by:
   updating a project status included in a project profile based on the conversation keyword;
   selecting a list of remaining project tasks;
   determining a list of scheduled project resources scheduled to implement the remaining project tasks;
   generating a graphical user interface including the list of scheduled project resources; and
   transmitting the graphical user interface to the scheduled project resources.

6. The enterprise server computer of claim 5, further comprising a resource configuration circuitry configured to:
   execute the machine learning engine to generate a recommended list of resources for implementing the remaining project tasks; and
   include the recommended list of resources in the graphical user interface.

7. The enterprise server computer of claim 1, wherein the project management circuitry is further configured to:
   generate project performance data based on a project performance evaluation received upon completion of the project; and
   store the project performance data in a historical database.

8. A method comprising:
   receiving, through a communication interface, process data from the first resource and the second resource during implementation of a project, the process data including conversation data between the first resource and the second resource;
   accessing, through the communication interface, keyword data from a rules database;
   translating, by a natural language processing tool, audio data included in the conversation data into textual data tokens;
   comparing the conversation data with the keyword data;
   identifying a conversation keyword from the conversation data, the conversation keyword included in the keyword data;
   accessing, through the communication interface, a project plan including a list of project tasks for the project;
   determining a first project task is completed based on the conversation keyword;
   determining a next project task based on the conversation keyword;
   generating a machine interface comprising a rendering of the next project task;
   transmitting the machine interface to an external entity; and
   executing a machine learning engine to:
      monitor and track progression of the project by identifying each project task included in the project plan;
      track an order in which each project task is accomplished during a duration of the project;
      generate an effectiveness rating reflecting an effectiveness of implementing the project in the order the project tasks were completed compared to same or similar projects that implemented same or similar project tasks in a different order; and
      track a status of the project to dynamically generate a digital project scheduler that identifies a list of remaining tasks to complete the project and an optimized order in which to accomplish the remaining tasks.

9. The method of claim 8, further comprising:
   executing a resource identifier engine to recognize a speaker from the audio data.

10. The method of claim 9, further comprising:
    executing, by a sentiment analyzer circuitry, an emotion detection engine to determine an emotional state of the speaker from the audio data; and
    updating the project plan to identify the emotional state of the speaker.

11. The method of claim 8, wherein each project plan includes a list of completed project tasks, a list of remaining project tasks, and a list of project team resources.

12. The method of claim 8, wherein generating the machine interface comprises:
    updating a project status included in a project profile based on the conversation keyword;
    selecting a list of remaining project tasks;
    determining a list of scheduled project resources scheduled to implement the remaining project tasks;
    generating a graphical user interface including the list of scheduled project resources; and
    transmitting the graphical user interface to the scheduled project resources.

13. The method of claim 12, further comprising:
    executing, by a resource configuration circuitry, the machine learning engine to generate a recommended list of resources for implementing the remaining project tasks; and
    including the recommended list of resources in the graphical user interface.

14. The method of claim 8, further comprising:
    generating project performance data based on a project performance evaluation received upon completion of the project; and
    storing the project performance data in a historical database.

15. A system comprising:
    at an enterprise location:
       a communication interface operable to communicate with:
          a first resource location at which a first resource produces a first communication data; and
          a second resource location at which a second resource produces a second communication data;
       a natural language interpreter circuitry coupled to the communication interface, the natural language interpreter circuitry configured to translate audio data included in the first communication data or second communication data into textual data tokens and convert the first communication data and the second communication data including the textual data tokens into natural language data; and a project management circuitry in communication with the natural language interpreter circuitry and the communication interface, the project management circuitry configured to:
  access, through the communication interface, keyword data from a rules database;
  compare the natural language data with the keyword data;
  identify a conversation keyword from the natural language data, wherein the conversation keyword is included in the keyword data;
  access, through the communication interface, a project plan from a project plan database, the project plan including a list of project tasks for a project;
  determine a first project task is completed based on the conversation keyword;
  determine a next project task based on the conversation keyword;
  generate a machine interface comprising a rendering of the next project task;
  transmit the machine interface to an external entity; and
  execute a machine learning engine to:
    monitor and track progression of the project by identifying each project task included in the project plan;
    track an order in which each project task is accomplished during a duration of the project;
    generate an effectiveness rating reflecting an effectiveness of implementing the project in the order the project tasks were completed compared to same or similar projects that implemented same or similar project tasks in a different order; and
    track a status of the project to dynamically generate a digital project scheduler that identifies a list of remaining tasks to complete the project and an optimized order in which to accomplish the remaining tasks.

16. The system of claim 15, wherein the project management circuitry is further configured to:
  execute a resource identifier engine to recognize a speaker from audio data included in the first communication data;
  execute an emotion detection engine to determine an emotional state of the speaker from the audio data; and
  update the project plan to identify the emotional state of the speaker.

17. The system of claim 15, wherein the project management circuitry is configured to generate the machine interface by:
  updating a project status included in a project profile based on the conversation keyword;
  selecting a list of remaining project tasks;
  determining a list of scheduled project resources scheduled to implement the remaining project tasks;
  generating a graphical user interface including the list of scheduled project resources; and
  transmitting the graphical user interface to the scheduled project resources.

18. The system of claim 17, further comprising a resource configuration circuitry configured to:
  execute the machine learning engine to generate a recommended list of resources for implementing the remaining project tasks; and
  include the recommended list of resources in the graphical user interface.

19. The system of claim 16, further comprising a resource configuration circuitry configured to recommend a speaker be added or removed from a project team of the next project task based on the determined emotional state of the speaker.

20. The system of claim 15, further comprising a resource configuration circuitry configured to:
  analyze historical project performance data to determine historical performance data for a particular resource;
  when the determined historical performance data for the particular resource is below a predetermined threshold, recommend that the particular resource be removed from a project team of a project task at which the particular resource is predicted to perform poorly; and
  when the determined historical performance data for the particular resource is above the predetermined threshold, recommend that the particular resource be added to the project team of a project task at which the particular resource is predicted to perform well.

* * * * *